United States Patent
Cohen et al.

(10) Patent No.: US 6,658,592 B1
(45) Date of Patent: Dec. 2, 2003

(54) ERROR DETECTION IN DISK STORAGE SYSTEMS

(75) Inventors: Aviram Cohen, Lexington, MA (US); Ishai Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 551 days.

(21) Appl. No.: 09/620,013

(22) Filed: Jul. 20, 2000

(51) Int. Cl.[7] .............................................. G06F 11/00
(52) U.S. Cl. ........................... 714/6; 711/113; 711/162
(58) Field of Search ......................... 714/5, 6; 711/113, 711/162

(56) References Cited

U.S. PATENT DOCUMENTS

| | | | |
|---|---|---|---|
| 5,206,939 A | 4/1993 | Yanai et al. | 395/400 |
| 5,381,539 A | 1/1995 | Yanai et al. | 395/425 |
| 5,893,152 A * | 4/1999 | Fuller et al. | 711/141 |
| 5,907,671 A * | 5/1999 | Chen et al. | 714/6 |
| 5,946,690 A * | 8/1999 | Pitts | 707/10 |
| 6,029,229 A | 2/2000 | Vishlitzky | 711/156 |
| 6,195,761 B1 * | 2/2001 | Kedem | 714/6 |
| 6,233,696 B1 * | 5/2001 | Kedem | 714/6 |
| 6,272,649 B1 * | 8/2001 | Hayward et al. | 714/6 |
| 6,438,661 B1 * | 8/2002 | Beardsley et al. | 711/144 |
| 6,502,108 B1 * | 12/2002 | Day et al. | 707/203 |

OTHER PUBLICATIONS

NB940685 Maintaining Data Coherency in a Cluster of AIX Systems, IBM Technical Disclosure Bulletin, Jun. 1994, US, volumn 37 Issue 6B, pp. 85–86.*

* cited by examiner

*Primary Examiner*—Scott Baderman
*Assistant Examiner*—Joshua Lohn
(74) *Attorney, Agent, or Firm*—Fish & Richardson P.C.

(57) ABSTRACT

A method for scanning a disk to verify the integrity of data records stored on the disk includes comparing copies of meta-data derived from a data record to be verified. For each data record, a first copy of the meta-data for that record is stored in a cache memory and a second copy of the meta-data for that record is stored on the disk. To verify a data record, a third copy of the meta-data is made by copying the second copy to the cache-memory element. The first and third copy are then compared to verify the integrity of the data record. By reducing the number of disk accesses and eliminating the need to access the data record itself, the scanning method enables a disk to be scanned rapidly.

20 Claims, 3 Drawing Sheets

ERROR DETECTION IN DISK STORAGE SYSTEMS

This invention relates to enterprise-wide data storage systems, and in particular, to methods and systems for detecting errors in data stored on such systems.

BACKGROUND

When we store data on a disk, we often take it for granted that we will one day be able to retrieve the identical data back from the disk. In reality, however, there are many more errors made in storing data on a disk than one might expect. Fortunately, error correction utilities, working invisibly in the background, can repair the overwhelming majority of these errors. That users repose such confidence in disk storage systems is a tribute to the unobtrusive effectiveness of these error correction utilities.

No matter how sophisticated an error correction utility is, it cannot repair an error that has not been brought to its attention. This function of detecting an error is achieved by error detection utilities that periodically scan the entire disk to identify disk errors. The time required to scan the disk depends in part on the size of the disk. As disks become increasingly large, the scanning time can become excessive. It is therefore desirable in the art to provide error detection utilities with disk scanning methods that are fast.

A naive approach to error detection is to compare a data record stored on a disk with another copy of the same data record stored elsewhere, either on the disk or on another disk in a disk array. A difficulty with this approach is its appetite for storage space. A requirement that a duplicate copy of each data record be maintained effectively halves the available capacity of any storage medium.

A more effective method for detecting a disk error is to store additional data that is derivable from and associated with a data record whose integrity is to be assessed (hereafter referred to as "the test record"). This additional data, hereafter referred to as "meta-data," can include checksums, CRC data, time stamps, data indicative of the physical location of the record within the drive, and parity bits. The use of meta-data to assess the integrity of a test record is advantageous because the meta-data is typically much smaller than the test record from which it was derived. Consequently, the storage capacity surrendered to the error detection process can be made much smaller.

Although the use of meta-data in the foregoing manner reduces the storage overhead associated with error detection, it does little to reduce its temporal overhead. To assess the integrity of the test record, both the test record and the meta-data are read from the disk and into memory. This consumes the time required for two read accesses. A second copy of the meta-data is then derived from the test record. This second copy is compared with the copy of the meta-data stored on disk. Both of these operations consume processing time.

Although the temporal costs associated with disk access processing small, they are incurred for each record on the disk. As a result, the process of scanning an entire disk can consume many hours of processing time that could otherwise be used to service the needs of the system's users. Because of this, the scanning process is typically scheduled for times during which the system's overall processing load is expected to be light, for example overnight.

As disks storage systems have evolved to include arrays of progressively larger disks, it has become progressively more difficult to scan the entire disk within a limited period. With such an overwhelmingly large number of records to scan, the foregoing disk scanning method rapidly becomes impractical.

SUMMARY

Rather than accessing the data records, the improved scanning method of the invention works entirely with the meta-data derived from those data records. Since the meta-data is significantly smaller than the data records from which it is derived, the scanning method more rapidly scans the mass-storage element. In addition, because of the minimal memory demands of the improved scanning method, a disk-scanning utility implementing the invention can operate with minimal interference to users of the data storage system.

The invention provides a method for scanning a mass-storage element to verify the integrity of a plurality of data records stored thereon. Each data record from the plurality of data records has associated with it meta-data derived from that data record. For the case of a CDK format disk, the meta-data can include the count field associated with the records on such a disk.

The method includes defining a selected data record and generating a comparison result indicative of a difference between a first copy of meta-data associated with the selected data record and a second copy of the meta-data associated with the selected data record. On the basis of the comparison result, the integrity of the data record is then assessed. If the comparison result indicates the existence of one or more differences between the first and second copies of the meta-data, the data record is assumed to contain errors. In this case, the data record is optionally flagged to draw the attention of a subsequently executed error-correction utility. Otherwise, the data record is assumed to be free of error.

In one aspect of the invention, the first copy of meta-data associated with the selected data record is stored in a cache-memory element and the second copy of meta-data associated with the selected data record is stored in the mass-storage element. Under these circumstances a third copy of the meta-data is created from the second copy. This third copy, is placed in the cache-memory element where it can quickly be compared with the first element. A first comparison result indicative of a difference between the third copy and the first copy is then generated. Since the third copy and the first copy are both in cache memory, and since both the third copy and the first copy are small, the first comparison result can be generated quickly.

On the basis of this first comparison result, a second comparison result is generated. This second comparison result is indicative of a difference between the first copy stored in the cache-memory element and the second copy stored on the mass-storage element.

In another aspect of the invention, the cache-memory element includes a control section and a data section. In this case, the third copy is created by copying the first copy from the mass-storage element to the control section of the cache-memory element. This enables a scanning utility according to the invention to operate without competing with users for cache slots in the cache-memory element.

These and other features and advantages of the invention will be apparent from the following detailed description and the accompanying figures in which:

DETAILED DESCRIPTION

Figure 1:
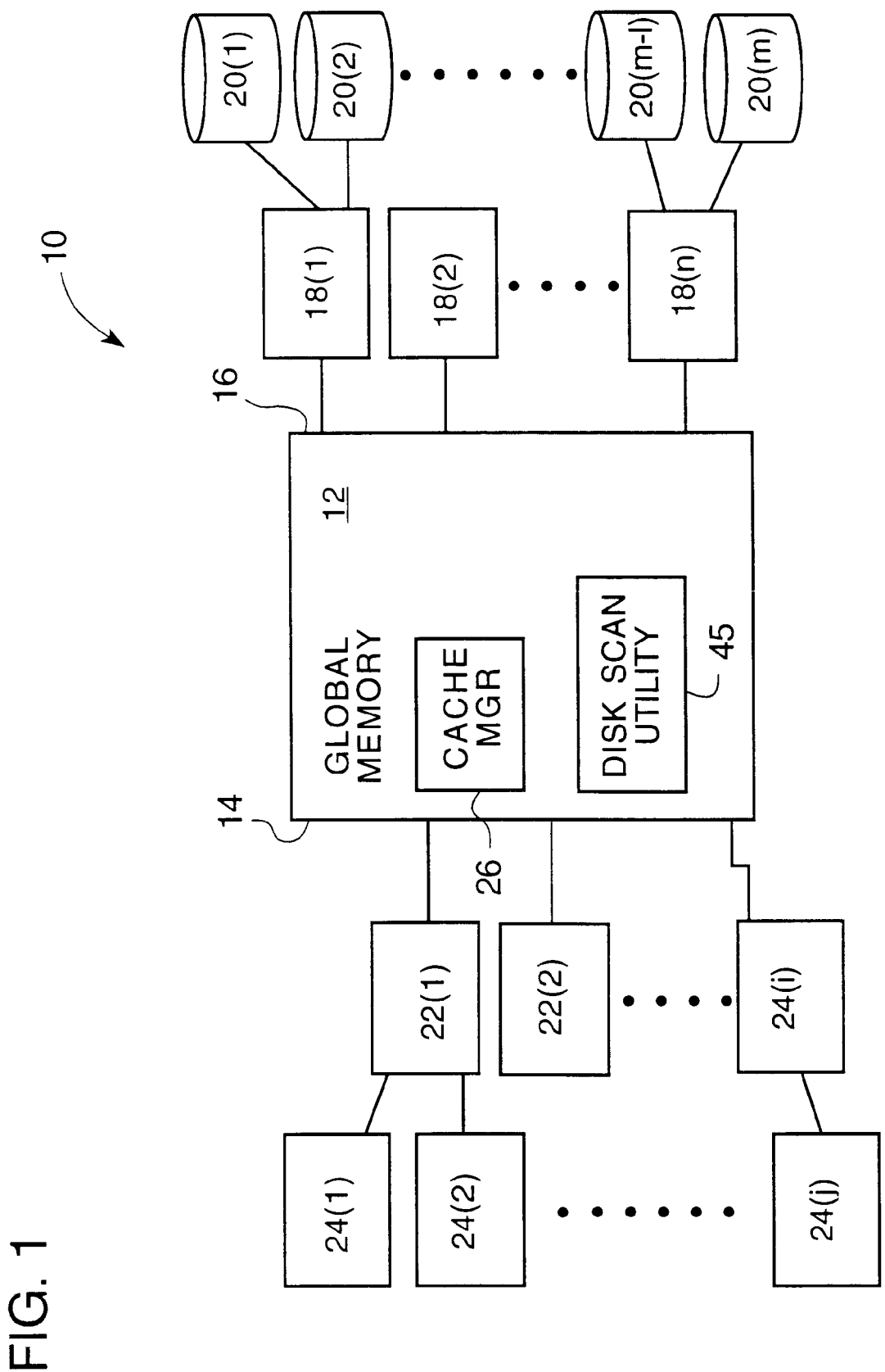
FIG. 1 is a schematic illustration of a data storage system incorporating the principles of the invention.

FIG. 1 shows a disk storage system 10 for practice of a disk scanning method according to the invention. The disk storage system 10 includes a global memory 12 having a front-end 14 and a back end 16. At its back end 16, the global memory 12 is in data communication with a plurality of device controllers 18(1)–18(n), each of which controls a plurality of storage devices 20(1)–20(m). At its front end 14, the global memory 12 is in data communication with a plurality of host adaptors 22(1)–22(i), each of which is in communication with a plurality of hosts 24(1)–24(j).

The host adaptors 22(1)–22(i) generate instructions for communicating data between the global memory 12 and the individual hosts 24(1)–24(j). Similarly, the device controllers 18(1)–18(n) generate instructions for communicating data between the global memory 12 and the individual storage devices 20(1)–20(m). Both the host adaptors 22(1)–22(i) and the device controllers 18(1)–18(n) are fully described in commonly owned U.S. Pat. No. 5,335,352 entitled "Reconfigurable Multi-Function Disk Controller," which is hereby incorporated by reference.

The storage devices 20(1)–20(m) are typically disk storage devices that include arrays of magnetic disk drives. However, depending on the requirements of the system's users, other mass storage devices such as tape drives or optical disks can be used in place of some or all of the disk storage devices.

The global memory 12 is typically a high-speed semiconductor memory for temporary storage of data that has been read from, or will ultimately be written to, at least one of the storage devices 20(1)–20(m). The transfer of data into and out of the global memory 12, and the allocation of global memory 12 among the storage devices 20(1)–20(m), is under the control of a cache manager 26. Although shown in FIG. 1 as being resident in global memory 12, the cache manager 26 is a virtual entity that can be resident elsewhere in the data storage system 10 or distributed among various components of the data storage system 10.

The interposition of a global memory 12 between the storage devices 20(1)–20(m) and a host 24(1) improves system throughput by largely eliminating the host's lengthy wait for disk access. From the host's point of view, the global memory 12 appears as a single logical disk with extremely low latency. In reality, the latency has still occurred, but it is borne by the cache manager 26 rather than by the host 24(1). The fact that the cache manager 26 later relays data from the global memory 12 to one or more storage devices 20(1)–20(m), or that the cache manager 26 pre-fetches data from those storage devices, is invisible to the host 24(1).

Figure 2:
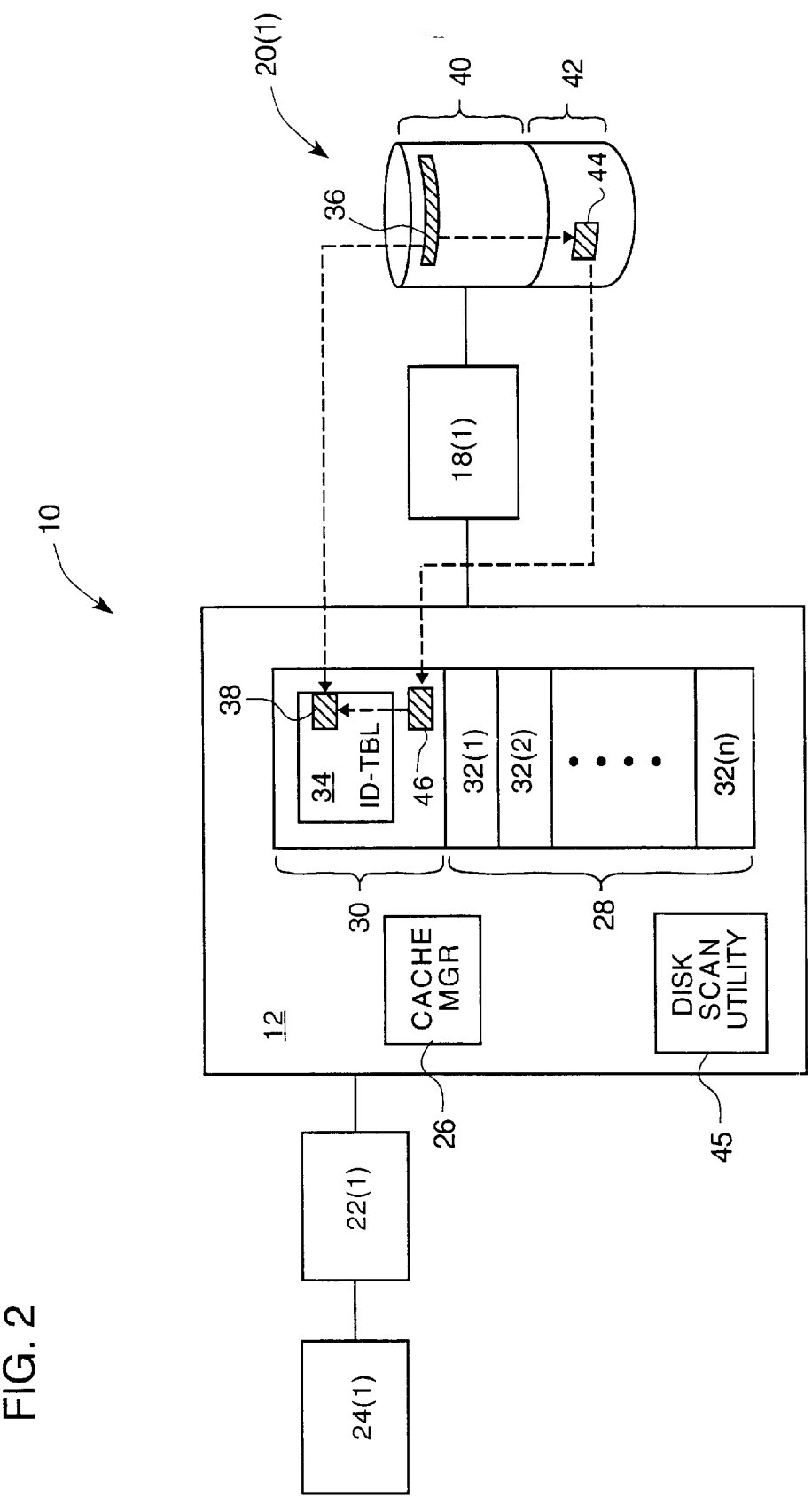
FIG. 2 is a schematic illustration of the architecture of the global memory shown in FIG. 1.

As shown in FIG. 2, global memory 12 is divided into a data storage section 28 and a control section 30. The data storage section 28 in turn is divided into a plurality of cache slots 32(1)–32(n), with each cache slot corresponding to one of the device controllers 18(1)–18(n) and representing a track accessible to that device controller. A particular device controller 18(1) accesses only its own corresponding cache slot 32(1) and not the cache slots 32(2)–32(n) associated with other device controllers 18(2)–18(n).

The control section 30 of global memory 12 includes an ID-table 34 maintained by the cache manager 26. This ID-table 34 contains information indicative of the contents of each storage device 20(1)–20(m). In particular, the ID-table 34 includes, for each record 36 stored on a storage device 20(1), a first copy 38 of meta-data corresponding to that record. The structure of the ID-table 34 is described in U.S. Pat. No. 5,381,539 entitled "System and Method for Dynamically Controlling Cache Management," the contents of which are incorporated by reference.

For disk drives having variable length records, the meta-data for a particular record 36 includes information indicating its logical location as well as its length. This information includes the cylinder and head, which together specify the track on which the record 36 can be found, the record number within the track, the key length, and the data length.

Also shown in FIG. 2 is the division of a typical storage device 20(1) into a data portion 40, which contains the record 36, and a control portion 42. For each data record 36 stored in the data portion 40, the control portion 42 stores a second copy 44 of the meta-data derived from that data record 36. In the absence of disk error, this second copy 44 of the meta-data is identical to the first copy 38 stored in the control section 30 of global memory 12.

To verify the integrity of a test record 36 stored on a particular storage device 20(1), a disk-scanning utility 45 causes the device controller 18(1) to retrieve from that storage device 20(1) the second copy 44 of the meta-data corresponding to that test record 36 and to place that meta-data in global memory 12. Although shown in FIG. 1 as being resident in global memory 12, the disk-scanning utility 45 is a virtual entity that can be resident elsewhere in the data storage system 10 or distributed among various components of the data storage system 10.

The disk-scanning utility 45 thus creates, in global memory 12, a third copy 46 of the meta-data. Preferably, to avoid consuming space in a cache slot, this third copy 46 of the meta-data is stored in the control section 30 of the global memory 12 rather than in a cache slot 32(1) in the data section 28 of the global memory 12.

At this point, the global memory 12, and in particular the control section 30 of the global memory 12, contains two copies of the meta-data corresponding to the test record 36: namely the first copy 38 and the third copy 46. The disk-scanning utility 45 then compares the first and third copies 38, 46 with each other. If the first copy 38 and the third copy 46 are identical, the disk-scanning utility 45 assumes that the test record 36 is error-free. If the first copy 38 and the third copy 46 differ, the disk-scanning utility 45 flags the test record 36 for attention from an error correction utility.

Figure 3:
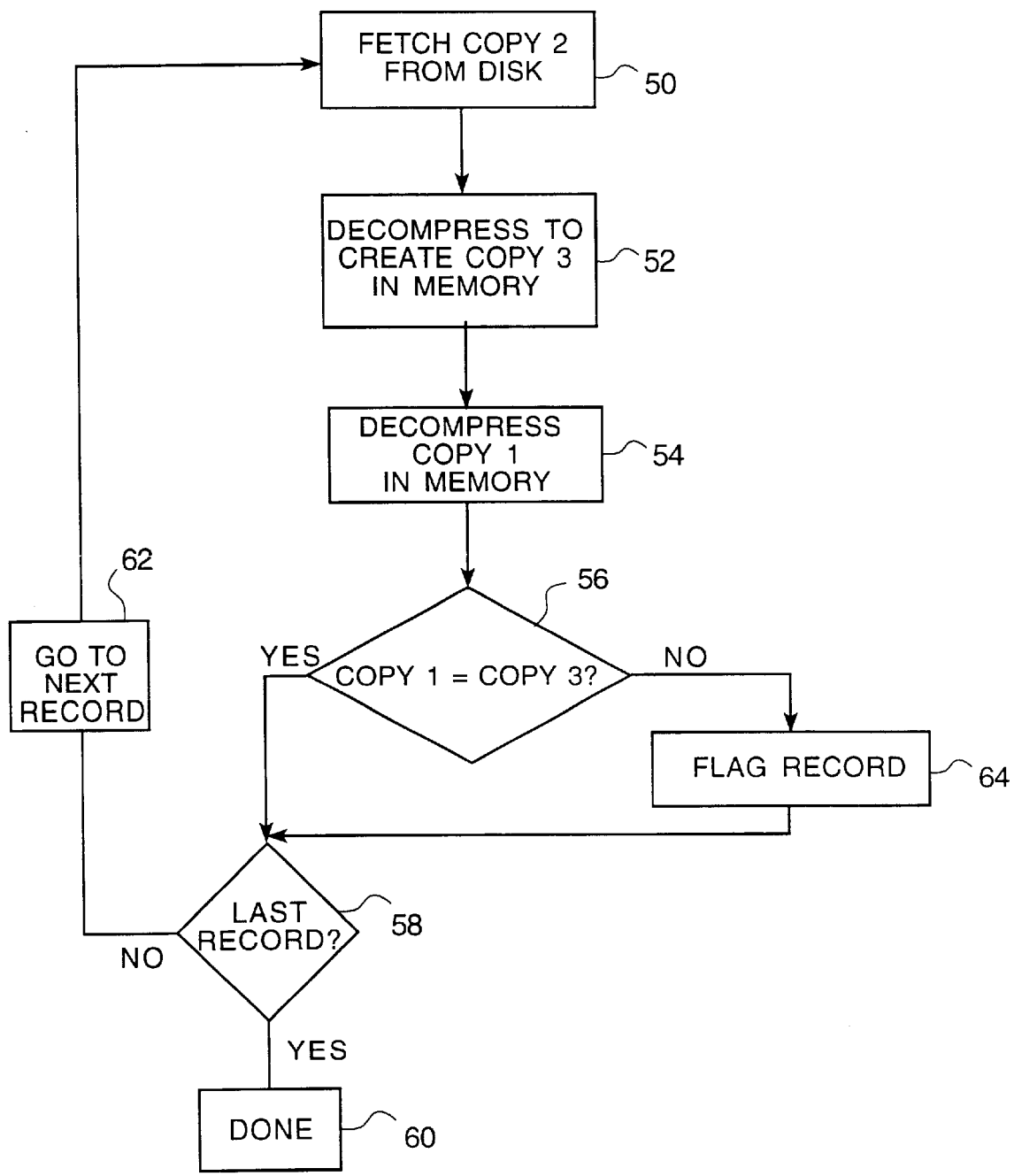
FIG. 3 is a flow-chart of the process carried out by the disk-scanning utility shown in FIG. 1.

FIG. 3 summarizes the disk scanning method carried out by the disk-scanning utility 45. To scan the records on the disk, the disk-scanning utility fetches 50 the second copy of the meta-data, which is stored on the disk being scanned, and brings it into the global memory, thereby creating a third copy of the meta-data. Preferably, all copies of the meta-data are stored in compressed format in order to save storage space, both on the disk and in global memory. As a result, in preparation for comparison of the first and third copies of the meta-data, the disk-scanning utility first decompresses 52, 54 the first copy and the third copy.

Following decompression, the disk-scanning utility compares 56 the first and third copies of the meta-data. If the first and third copies are identical, the disk-scanning utility determines 58 if the data record being examined is the last data record in the disk scan. If it is, the disk-scanning utility ends 60 the disk scan. Otherwise, the disk-scanning utility proceeds 62 to the next record.

If the first and third copies of the meta-data are not identical, then the scan utility assumes that there has been a disk error and flags 64 that record for attention by an error correction utility. The disk-scanning utility then proceeds to determine 58 if the data record being examined is the last data record in the disk scan. If it is, the disk-scanning utility ends 60 the disk scan. Otherwise, the disk-scanning utility proceeds 62 to the next record.

Because the first copy 38 is already present in global memory 12, the disk verification method set forth above eliminates one read access to the storage device 20(1). Because the second copy 44 is much smaller than the test record 36 from which it is derived, the remaining read access can be carried out quickly. Because the first copy 38 is compared against the third copy 46, there is no need to regenerate the disk meta-data 38 from the test record 36. This eliminates a time-consuming processing step. Finally, because the first and third copies 38, 46 are both small, a comparison between them can be carried out quickly. As a result, the on-line disk scanning method of the invention can be carried out quickly enough to make practicable the scanning of arrays of very large disks.

FIG. 3 shows the method of the invention as carried out one record at a time. However, to boost performance, and to minimize the overhead associated with reading from a mass-storage element relative to the amount of data retrieved during that read operation, it is preferable to fetch several cylinders worth of data at one time.

While the foregoing description sets forth a particular embodiment of the invention, it is not intended to be the only possible embodiment. The subject matter of the invention is limited only by the claims that follow.

What we claim as new and secured by Letters Patent is:

1. A method for verifying the integrity of a data record stored on a mass-storage element, said data record having associated meta-data derived from selected properties of said data record, a first copy of said meta-data being stored on said mass-storage element and a second copy of said meta-data being stored in a cache-memory element, said method comprising:
    creating a third copy of said meta-data by copying said first copy of said meta-data from said mass-storage element to said cache-memory element;
    generating a comparison result indicative of differences between said third copy of said meta-data with said second copy of said meta-data; and
    assessing, on the basis of said comparison result, the integrity of said data record.

2. The method of claim 1 wherein said cache-memory element includes a control section and a data section and creating said third copy comprises copying said first copy to said control section of said cache-memory element.

3. The method of claim 1 wherein said first copy of said meta-data is stored in compressed form and said method further comprises decompressing said first copy of said meta-data.

4. The method of claim 1 wherein said mass-storage element is a CDK format disk and said method further comprises selecting said meta-data to include a count field from said data record.

5. A method for scanning a mass-storage element to verify the integrity of a plurality of data records stored thereon, each data record from said plurality of data records having associated therewith meta-data derived from said data record, said method comprising:
    defining a selected data record from said plurality of data records;
    generating a comparison result indicative of a difference between a first copy of meta-data associated with said selected data record and a second copy of said meta-data associated with said selected data record; and
    assessing, on the basis of said comparison result, the integrity of said selected data record,
    wherein said first copy of meta-data associated with said selected data record is stored in said mass-storage element and said second copy of meta-data associated with said selected data record is stored in said cache-memory element, and generating a comparison result comprises:
        creating, in said cache-memory element, a third copy of meta-data associated with said selected data record from said first copy of said meta-data;
        generating a comparison result indicative of a difference between said third copy and said second copy, both of which are stored in said cache-memory element; and
        on the basis of said comparison result, generating a comparison result indicative of a difference between said first copy stored on said mass-storage element and said second copy stored in said cache-memory element.

6. The method of claim 5 wherein said cache-memory element includes a control section and a data section and creating said third copy comprises copying said first copy to said control section of said cache-memory element.

7. The method of claim 5 wherein said first copy of said meta-data is stored in compressed form and said method further comprises decompressing said first copy of said meta-data.

8. The method of claim 5 wherein said mass-storage element is a CDK format disk and said method further comprises selecting said meta-data record to be a count field from said data record.

9. A disk-scanning utility for verifying the integrity of a data record stored on a mass-storage element, said data record having associated meta-data derived from selected properties of said data record, a first copy of said meta-data being stored on said mass-storage element and a second copy of said meta-data being stored in a cache-memory element, said disk-scanning utility comprising:
    a data-replicator in communication with said cache-memory element and said mass-storage element for creating a third copy of said meta-data by copying said first copy of said meta-data from said mass-storage element to said cache-memory element;
    a comparator in communication with said cache-memory element for generating a comparison result indicative of differences between said third copy of said meta-data and said second copy of said meta-data; and
    an analyzer having access to said comparison result provided by said comparator for assessing, on the basis of said comparison result, the integrity of said data record.

10. The disk-scanning utility of claim 9 wherein said cache-memory element includes a control section and a data section and said data-replicator is in communication with said control section of said cache-memory element for copying said first copy to said control section of said cache-memory element.

11. The disk-scanning utility of claim 9 wherein said first copy of said meta-data is stored in compressed form and said disk-scanning utility further comprises a decoder for decompressing said first copy of said meta-data.

12. The disk-scanning utility of claim 9 wherein said mass-storage element is a CDK format disk and said disk-scanning utility further comprises means for selecting said meta-data to include a count field from said data record.

13. A disk-scanning utility for scanning a mass-storage element to verify the integrity of a plurality of data records stored thereon, each data record from said plurality of data records having associated therewith meta-data derived from said data record, said disk-scanning utility comprising:

a record-selector for selecting a data record from said plurality of data records, thereby defining a selected data record;

a comparator for receiving a copy of said selected data record for generating a comparison result indicative of a difference between a first copy of meta-data associated with said selected data record and a second copy of said meta-data associated with said selected data record; and an analyzer having access to said comparison result provided by said comparator for assessing, on the basis of said comparison result, the integrity of said selected data record, wherein said first copy of meta-data associated with said selected data record is stored in said mass-storage element and said second copy of meta-data associated with said selected data record is stored in said cache-memory element, and said disk scanning utility further comprises:

a data-replicator in communication with said cache-memory element and said mass-storage element for creating, in said cache-memory element, a third copy of meta-data associated with said selected data record from said first copy of said meta-data;

said comparator generating a comparison result indicative of a difference between said third copy and said second copy, both of which are stored in said cache-memory element; and said analyzer generating, on the basis of said comparison result, data indicative of a difference between said first copy stored on said mass-storage element and said second copy stored in said cache-memory element.

14. The disk-scanning utility of claim 13 wherein said cache-memory element includes a control section and a data section and said data-replicator is in communication with said control section of said cache-memory element for copying said first copy to said control section of said cache-memory element.

15. The disk-scanning utility of claim 13 wherein said first copy of said meta-data is stored in compressed form and said disk-scanning utility further comprises a decoder for decompressing said first copy of said meta-data.

16. The disk-scanning utility of claim 13 wherein said mass-storage element is a CDK format disk and said disk-scanning utility further comprises means for selecting said meta-data to include a count field from said data record.

17. A computer-readable medium having encoded thereon software for verifying the integrity of a data record stored on a mass-storage element, said data record having associated meta-data derived from selected properties of said data record, a first copy of said meta-data being stored on said mass-storage element and a second copy of said meta-data being stored in a cache-memory element, said software including computer-executable instructions for:

creating a third copy of said meta-data by copying said first copy of said meta-data from said mass-storage element to said cache-memory element;

generating a comparison result indicative of differences between said third copy of said meta-data with said second copy of said meta-data; and assessing, on the basis of said comparison result, the integrity of said data record.

18. The computer-readable medium of claim 17 wherein said cache-memory element includes a control section and a data section and said computer-executable instructions for creating said third copy comprise computer-executable instructions for copying said first copy to said control section of said cache-memory element.

19. The computer-readable medium of claim 17 wherein said first copy of said meta-data is stored in compressed form and said software further comprises computer-executable instructions for decompressing said first copy of said meta-data.

20. The computer-readable medium of claim 17 wherein said mass-storage element is a CDK format disk and said software further comprises computer-executable instructions for selecting said meta-data to include a count field from said data record.

* * * * *